Dec. 20, 1966 M. J. COOPER 3,292,935

TONE ARM FOR GRAMOPHONE

Filed July 29, 1963 2 Sheets-Sheet 1

Inventor
Margaret J. Cooper
By
Watson, Cole, Grindle & Watson
Attorneys

TONE ARM FOR GRAMOPHONE

Filed July 29, 1963 2 Sheets-Sheet 2

Inventor
Margaret J. Cooper
By Watson, Cole, Grindle & Watson
Attorneys 3,292,935

TONE ARM FOR GRAMOPHONE

Margaret Joan Cooper, Purley, England, assignor to Decca Limited, London, England, a British company Filed July 29, 1963, Ser. No. 298,026
Claims priority, application Great Britain, July 30, 1962, 29,174/62
5 Claims. (Cl. 274—23)

This invention relates to tone arms for gramophones and mountings for such tone arms, and also to gramophones using such tone arms.

When disc records for reproduction on a gramophone are made the cutting stylus moves along a radius of the disc. In a gramophone reproducing from such record the tone arm which carries the pick-up head is pivoted away from the centre of rotation of the record, outside the periphery of the record and thus the pick-up stylus moves over the record in an arc. As the modulated sound is impressed on the record radially thereof the reproducing stylus is misaligned from the corresponding position of the cutting or recording stylus and this misalignment is termed "tracking error." Further the forward drag on the reproducing stylus due to the departure from a radial track will produce a side thrust on that stylus. The magnitude of this side thrust varies with the position of the stylus on its arc of movement, with the amount of downward pressure on the stylus, frictional coefficient between the stylus and the material of the disc and with the relative distances, centre of rotation of the record to the tone arm pivot and stylus point to tone arm pivot (effective tone arm length).

In order to minimise distortion due to tracking error it is common practice to make the effective tone arm length appreciably longer than the length between the centre of rotation of the record and the tone arm pivot. In order for this to be done the horizontal axis of the pick-up head carried on the end of the tone arm is offset from the horizontal axis of the main part of the tone arm in order to bring the horizontal axis of the pick-up head more nearly tangential to the record groove at all playing positions of the reproducing stylus. This results in the side thrust on the stylus being of a higher magnitude than would be obtained with a shorter tone arm. The resultant deflection of the stylus can approach that produced by the lateral modulation of the groove in the record, and thus can give rise to serious even order harmonic effects when reproducing lateral cut records and more complicated distortion when reproducing stereophonic records in which the modulation for each channel has both lateral and vertical components.

It is known to reduce this side thrust by means of suitably disposed springs or weights or by angular displacement of the horizontal and/or vertical axes of the tone arm.

According to the present invention there is provided a method of reducing side thrust of the pick-up stylus caused by tracking error which comprises applying magnetic force on the tone arm to oppose the said thrust.

The magnetic force can be provided in several different ways. Magnets, whether permanent magnets or electro-magnets, may be mounted on the tone arm and on the mounting for the tone arm respectively and these magnets may be so arranged as to provide the required magnetic force either by magnetic attraction or by magnetic repulsion. It is also possible to place a magnet on the tone arm and a piece of magnetic material such as mild steel on the mounting for the tone arm, or vice versa, so that the attraction of the magnet for the piece of magnetic material opposes the above mentioned side thrust.

In addition to providing a simpler and more robust mechanical assembly than known methods, the invention lends itself to more accurate correction since by suitable disposition or shaping of the magnet or magnets producing the opposing force, that force may be made to vary with the variation of side thrust as the stylus traverses the playing arc over the record.

The invention and the manner of performing it will be better understood from the following description taken in conjunction with the accompanying drawings, in which.

Figure 1:
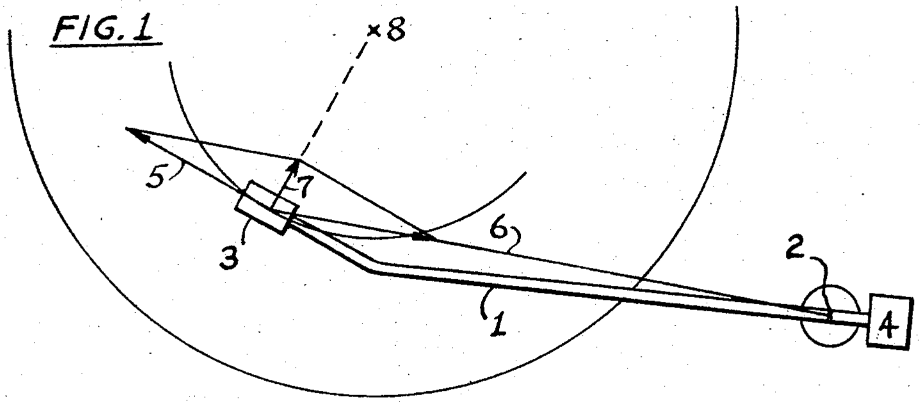
FIGURE 1 is a diagrammatic representation of the forces involved in producing an inward thrust on a tone arm in a typical case.

Referring to the drawings, and first to figure 1, there is here shown diagrammatically a tone arm 1, pivoted at 2 and carrying a pick-up head 3 and a counter weight 4. The tone arm 1 is shown as bent towards the end carrying the pick-up head 3 so that this pick-up head is inclined towards the centre of the record and the longitudinal axis thereof lies at an angle to the longitudinal axis of the main part of the tone arm 1. The direction of the force acting on the stylus tangential to the record groove is shown at 5 and the restraining force provided by the tone arm is along the line 6, joining the stylus point to the pivot 2 of the tone arm. Due to the forces in the directions 5 and 6 there is a resultant thrust along the line 7 directed towards the axis 8 of the turntable for the record. This thrust is related to the effective length of the tone arm, that is the distance from 2 to 3, the tangent of the angle between the directions 5 and 6, the playing weight or vertical weight at the stylus tip located at 3, the coefficient of friction between the stylus and the record groove and the speed of the record groove during reproduction. This thrust is shown in figure 1 as being directed towards the centre 8 of the record, and this is the case if the angle subtended at the stylus between the radius of the record and the line joining the stylus and the pivot of the tone arm is less than 90 degrees and as this is the case with all commercial tone arms of which I am aware this inward thrust is assumed in the description which follows.

With conventional disc records and stylus materials the side thrust acting on the stylus is found to be between one fifth and one tenth of the effective downward pressure on the stylus and varies by some 20% over the playing arc.

It is necessary to correct for this side thrust if accurate reproduction of the recorded sound is to be obtained. As stated above, the side thrust is, according to the invention opposed by magnetic force and in the embodiments to be described this magnetic force is used to apply an outward moment to the tone arm i.e. the magnetic force tends to rotate the tone arm in the direction opposite to that in which it moves across a record during reproduction therefrom. Preferably also the magnetic force is applied about the pivot for the movement of the tone arm in a horizontal plane.

Figure 2:
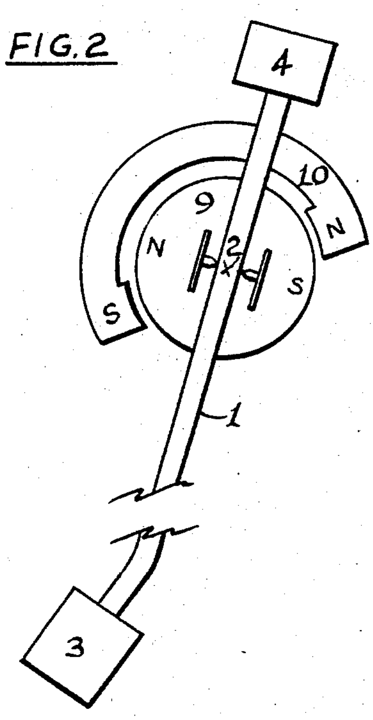
FIGURE 2 is a diagram to show a disposition of magnets providing magnetic attraction for the purpose of the inventions.

FIGURE 2 shows a permanent magnet in the form of a disc 9 magnetised across its diameter. This magnet is mounted on the tone arm 1 with the centre of the disc coinciding with the pivot 2 of the tone arm and the disc 9 rotates as the tone arm rotates during reproduction. Fixed to the pivot base is a second permanent magnet 10 in the form of a circular arc, having poles at its extremities and arranged with a north pole acting on the south pole of the magnet 9. As the tone arm 1 rotates clockwise during reproduction from a record magnetic attraction between the magnets 9 and 10 provides a magnetic force opposing the thrust of the pick-up towards the centre of a disc record.

Figure 3:
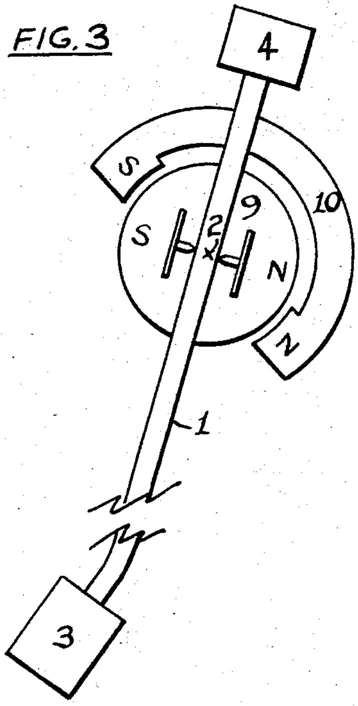
FIGURE 3 is a diagram showing a disposition of magnets providing magnetic repulsion for the same purpose.

FIGURE 3 is a view similar to that of FIGURE 2 but showing a disposition of magnets 9 and 10 by which magnetic repulsion instead of attraction provides the magnetic force opposing the side thrust.

In the case of both FIG. 2 and FIG. 3 the magnet 9 rotates with the rotation of the tone arm and in consequence the magnetic force between the poles of magnets 9 and 10 alters as the pick-up stylus moves over the record. This variation of magnetic force opposing the thrust on the side wall of the groove can be made to follow the variation in such thrust as the tone arm moves over the record, e.g. by shaping the disc 9 so that the air gap in the magnetic path varies with the movement of the disc.

Figure 4A:
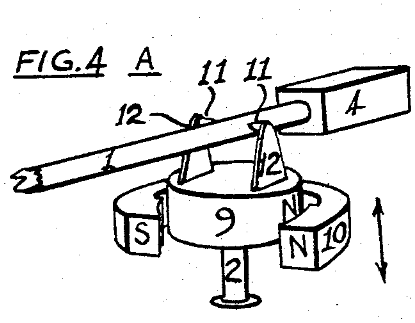
FIGURES 4A and 4B show two different ways in which the magnetic force acting on the tone arm can be set to a desired amount.

FIGURE 4A shows one manner in which the magnet 9 may be mounted on the tone arm and also one means for adjusting the magnetic force between the magnets 9 and 10. The disc magnet 9 is fixed to the pivot pin 2 of the tone arm and the latter is pivoted in a vertical plane on pivots 11 fixed in brackets 12 mounted on disc 9. Variation of magnetic force between magnets 9 and 10 is carried out by moving magnet 10 upwards or downwards.

Figure 4B:
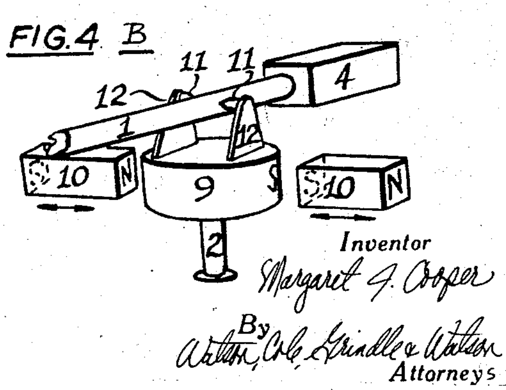

In FIGURE 4B magnet 9 is mounted and the tone arm mounted thereon in the same manner as in FIGURE 4A. Magnet 10 is in the form of two permanent bar magnets mounted adjacent to opposite ends of a diameter of disc magnet 9. Adjustment of magnetic force is carried out by moving the two bar magnets 10 towards or away from disc magnet 9 in a horizontal plane.

Figure 5:
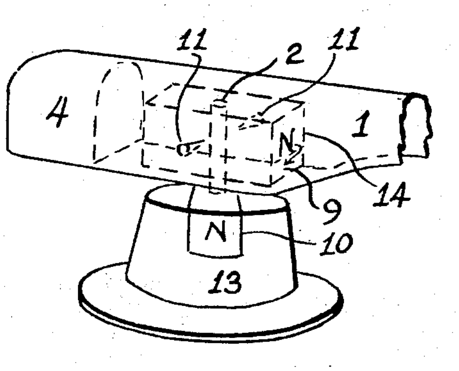
FIGURE 5 shows a typical tone arm and mounting with magnets added according to the invention.

FIGURE 5 shows a typical tone arm and mounting assembly with the invention applied thereto. Only the pivoted end of the tone arm is shown as the other end of the tone arm, carrying the pick-up head is conventional and may take any well known form. The tone arm 1 is hollow as is conventional and the pivot 2 for the rotation of the tone arm in a horizontal plane extends upwards from a fixed base 13 and is journalled in a block 14 rotating with the tone arm 1 and carrying the pivots 11 for the vertical movement of the tone arm. 4 is the counterweight by which the vertical pressure of the reproducing stylus on the record is adjusted. The block 14 carries the magnet 9, which may be in the form shown in FIGURE 3 or, as shown in FIGURE 5 in the form of a bar magnet. Mounted in the fixed base is a second bar magnet 10 with its north pole adjacent to the north pole of magnet 9, the south poles being thus similarly adjacent. Magnetic repulsion between the poles of magnet 9 and those of magnet 10 provides magnetic force opposing the side thrust of the stylus and thus tends to rotate the tone arm in the direction opposed to that in which it rotates over a record being reproduced.

Figures 6, 6A:
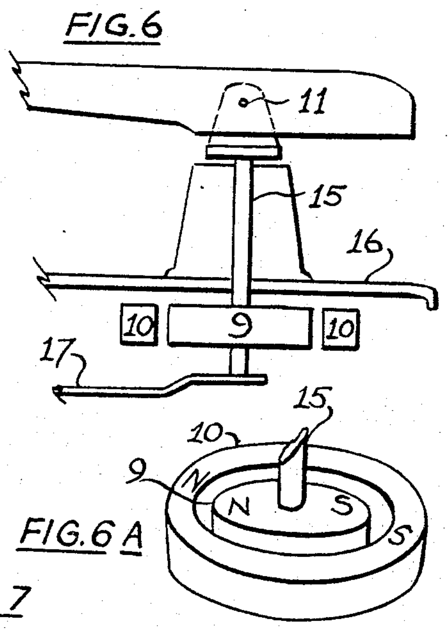
FIGURE 6 shows one manner in which the invention can be carried out particularly suited to the automatic type of record player or record changer.
FIGURE 6A shows in greater detail part of the arrangement of FIGURE 6.

FIGURE 6 shows an arrangement of tone arm used in an automatic type of record player or record changer. In such a gramophone the tone arm 1 is supported on a rear pivot 15 which is journalled in the motor plate 16, i.e. the plate which carries on its upper side the turntable for the record and on its under side the motor driving the turntable. The tone arm 1 is pivoted for movement in a vertical plane on pivots 11 and rotates in a horizontal plane over the record with the pivot 15. This pivot also carries the arm 17 which effects the various changes necessary in an automatic record player. The invention is applied to this type of gramophone by fixing a permanent magnet 9 to the pivot 15 and surrounding this magnet 9 by a fixed permanent 10. As shown in more detail in FIG. 6A the magnet 9 may take the form of a disc magnetised across its diameter and the magnet 10 be formed as a ring or torus also magnetised across a diameter. The two magnets are so placed that the poles of one are in juxtaposition with the poles of the other and are spaced from one another at the distance necessary for the required amount of repulsive force.

Figure 7:
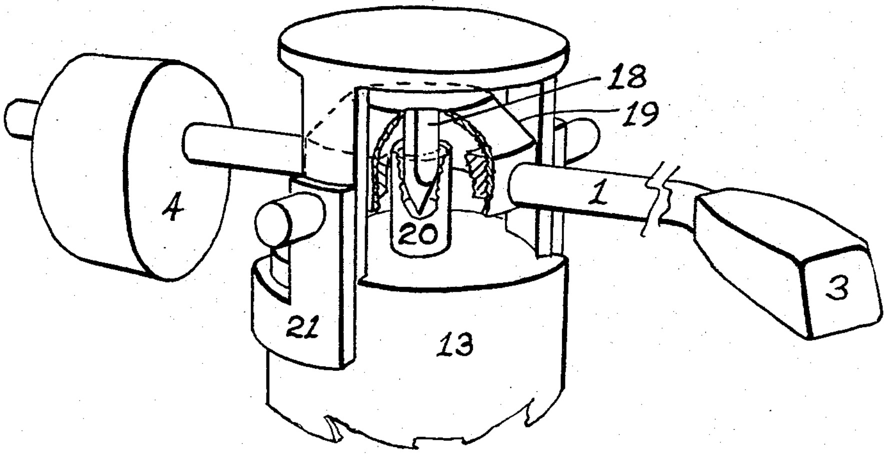
FIGURE 7 shows another practical form of the invention.
Figure 8:
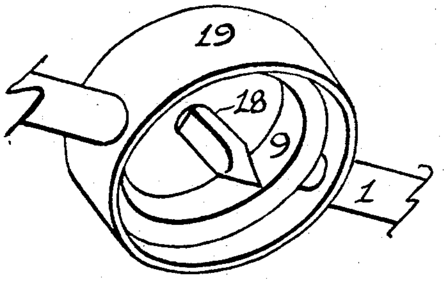
FIGURES 8 and 9 show details thereof.
Figure 9:
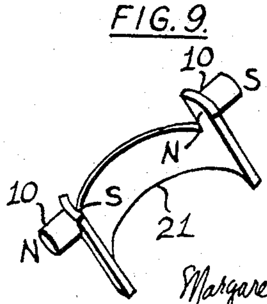

Another practical form of the invention is shown in FIGURES 7 to 9. In this embodiment the pivot of the tone arm is constituted by a blade shaped member 18, best seen in FIGURE 8, terminating in a needle point affixed to the tone arm 1 and rotating and rocking in a conical socket in the fixed pivot member 20. FIGURE 7 is a view partly broken away to show the member 20. The fixed pivot member may be in the form of a cup filled with a viscous fluid. The member 18 affords both lateral and vertical pivoting and the blade shape of this member in conjunction with the viscous fluid in the cup 20 provides a degree of mechanical damping on the movements of the tone arm 1. A circular ring magnet 9 magnetised across a diameter is mounted in a cylindrical cup 19 which also carries the blade 18. The magnet 9 reacts against the field of a pair of magnets 10. As shown in FIGURE 9 the magnets 10 are mounted in a stirrup shaped element 21 which extends over rather more than 180 degrees of arc and is arranged to be a smooth sliding fit over the exterior of the pivot base 13 containing the fixed pivot 20 for the tone arm. The bar magnets 10 are aligned to provide the appropriate magnet field across the axis of rotation of the tone arm 1 to react with the field of the ring magnet 9. The stirrup 21 is conveniently made of an organic plastic material such as polyethylene and grips the pivot base 13 in an elastic manner so that it is readily moved vertically along the exterior of the base 13 to vary the field between the magnets 9 and 10.

I claim:

1. A tone arm and mounting therefor for reproducing sound from disc records comprising a pivot for horizontal rotation of the tone arm over the surface of a record, a permanent magnet fixed to the tone arm symmetrically about said pivot and permanent magnet means fixed to the mounting for said tone arm symmetrically about said pivot, the magnetic force between the said permanent magnet and said permanent magnet means tending to rotate said tone arm about said pivot in a direction opposed to the direction of rotation of said tone arm when reproducing from a record.

2. A tone arm and mounting therefor as claimed in claim 1 in which the poles of said permanent magnet and said permanent magnet means are positioned so that unlike poles are adjacent whereby the said magnetic force is a force of attraction.

3. A tone arm and mounting therefor as claimed in claim 1 in which the poles of said permanent magnet and said permanent magnet means are positioned so that like poles are adjacent whereby the said magnetic force is a force of repulsion.

4. A tone arm and mounting therefor as claimed in claim 1 wherein said permanent magnet fixed to the tone arm comprises a disc, the center axis of said disc being aligned with said pivot for said tone arm, said disc being magnetized diametrically across said center axis whereby the poles of said permanent magnet are on diametrically opposite sides of said pivot.

5. A tone arm and a mounting therefor as claimed in claim 4 wherein said permanent magnet means fixed to said mounting comprises an arcuately shaped magnet having its ends located on said diametrically opposite sides of said pivot for said tone arm, said arcuately shaped magnet being magnetized so as to form its poles at said ends so as to be adjacent to the poles of said permanent magnet.

References Cited by the Examiner

UNITED STATES PATENTS

| | | | |
|---|---|---|---|
| 1,866,403 | 7/1932 | Elmer | 274—23 |
| 2,277,344 | 3/1942 | Miller | 274—23 |
| 2,647,753 | 8/1953 | Goldmark | 274—23 |
| 3,088,742 | 5/1963 | Alexandrovich | 274—23 |
| 3,156,472 | 11/1964 | Brock | 274—23 |

FOREIGN PATENTS

| | | |
|---|---|---|
| 1,084,964 | 7/1954 | France. |
| 1,243,023 | 8/1960 | France. |

NORTON ANSHER, *Primary Examiner.*

WILLIAM E. JACKSON, JOSEPH F. PETERS, *Assistant Examiners.*